(12) United States Patent
Parron

(10) Patent No.: US 9,144,110 B2
(45) Date of Patent: Sep. 22, 2015

(54) MODEM DEVICES, APPLICATION PROCESSORS, COMMUNICATION DEVICES, METHODS FOR CONTROLLING A MODEM DEVICE, METHODS FOR CONTROLLING AN APPLICATION PROCESSOR, AND METHODS FOR CONTROLLING A COMMUNICATION DEVICE

(71) Applicant: Intel Mobile Communications GmbH, Neubiberg (DE)

(72) Inventor: Jerome Parron, Fuerth (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 14/316,978

(22) Filed: Jun. 27, 2014

(65) Prior Publication Data

US 2014/0308943 A1    Oct. 16, 2014

Related U.S. Application Data

(63) Continuation of application No. 13/977,163, filed as application No. PCT/IB2012/002293 on Sep. 17, 2012.

(51) Int. Cl.
*H04W 88/06* (2009.01)
*H04W 4/00* (2009.01)

(52) U.S. Cl.
CPC .............. *H04W 88/06* (2013.01); *H04W 4/003* (2013.01)

(58) Field of Classification Search
CPC . H04L 67/303; H04L 67/306; H04L 65/1069; H04L 69/24; H04W 4/003; H04W 88/06
See application file for complete search history.

(56) References Cited

U.S. PATENT DOCUMENTS

| 4,742,482 | A | 5/1988 | Inskeep et al. |
| 6,298,092 | B1 | 10/2001 | Heath, Jr. et al. |
| 7,123,887 | B2 | 10/2006 | Kim et al. |
| 2004/0218586 | A1* | 11/2004 | Khoury et al. ............... 370/352 |
| 2006/0291484 | A1 | 12/2006 | Naqvi et al. |

(Continued)

FOREIGN PATENT DOCUMENTS

| EP | 2403203 A1 | 1/2012 |
| WO | 2014/041392 A1 | 3/2014 |

OTHER PUBLICATIONS

International Search Report received for PCT Application No. PCT/IB2012/002293, mailed on Aug. 19, 2013, 6 pages.
3rd Generation Partnership Project; Technical Specification Group Core Network and Terminals; AT command set for User Equipment (UE) (Release 11).

(Continued)

*Primary Examiner* — Leon Flores

(57) ABSTRACT

A modem device may be provided. The modem device may include: a transceiver structure configured to transmit and receive data using at least one of a plurality of communication technologies; a memory configured to store a profile, the profile including or being information specifying a configuration of the transceiver structure for each communication technology of the plurality of communication technologies; and an application processor interface, wherein the modem device is configured to receive from the application processor a command for configuring the transceiver structure through the application processor interface. The command may include or may be an instruction to the modem device to configure the transceiver structure according to the profile.

27 Claims, 11 Drawing Sheets

(56) References Cited

U.S. PATENT DOCUMENTS

2008/0102815 A1    5/2008   Sengupta et al.
2009/0116440 A1    5/2009   Zhao et al.
2012/0082095 A1*   4/2012   Sun ............................... 370/328
2013/0332615 A1*  12/2013   Kowalewski ................. 709/227

OTHER PUBLICATIONS

Office Action received for U.S. Appl. No. 13/977,163, Non-final Office Action mailed on Dec. 12, 2014, 14 pages.
IPRP of the corresponding PCT Patent Application No. PCT/IB2012/002293, issued Mar. 17, 2015, 13 pages.

* cited by examiner

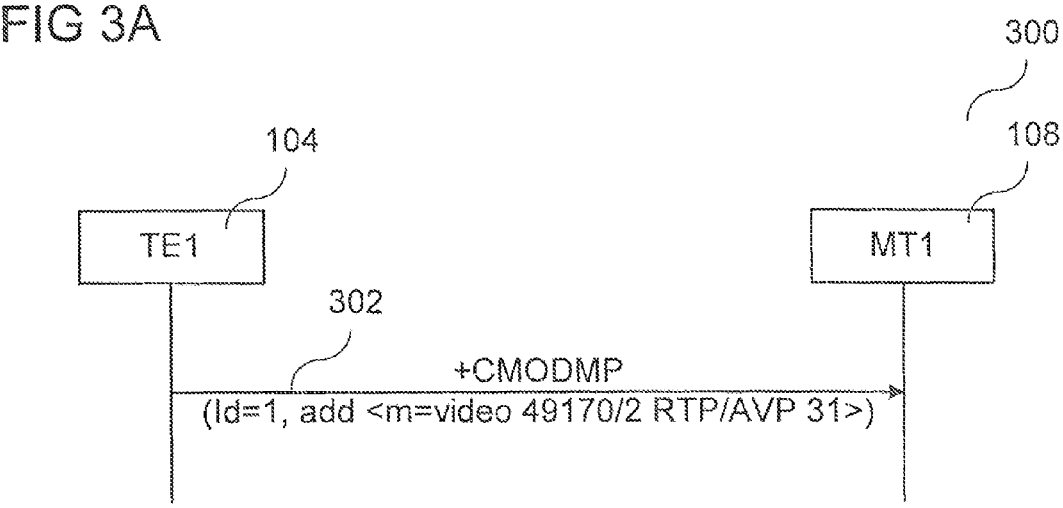
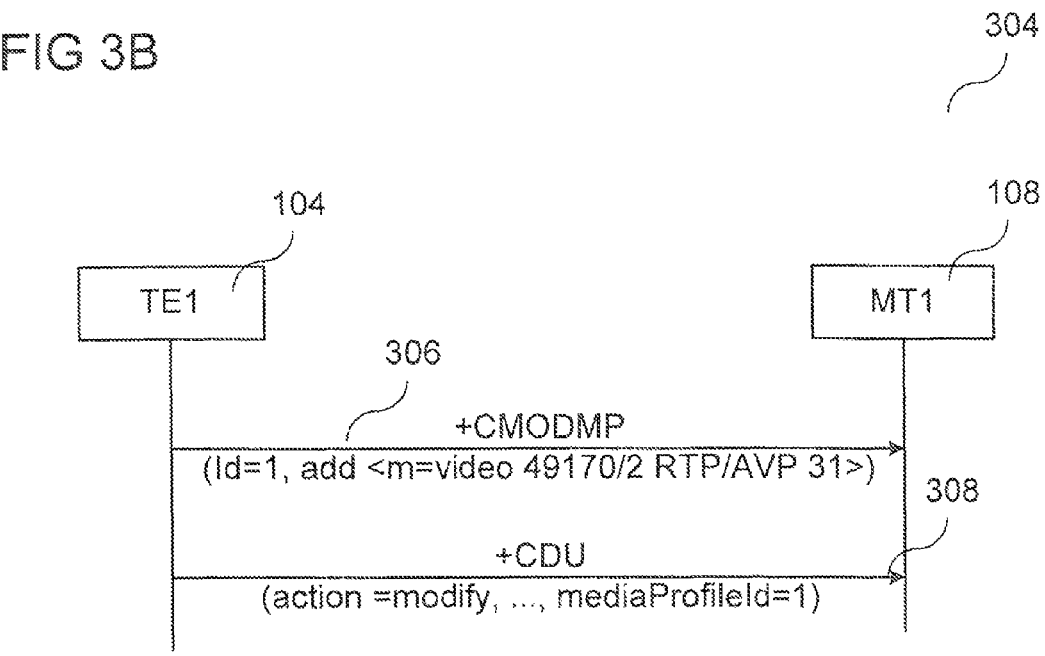

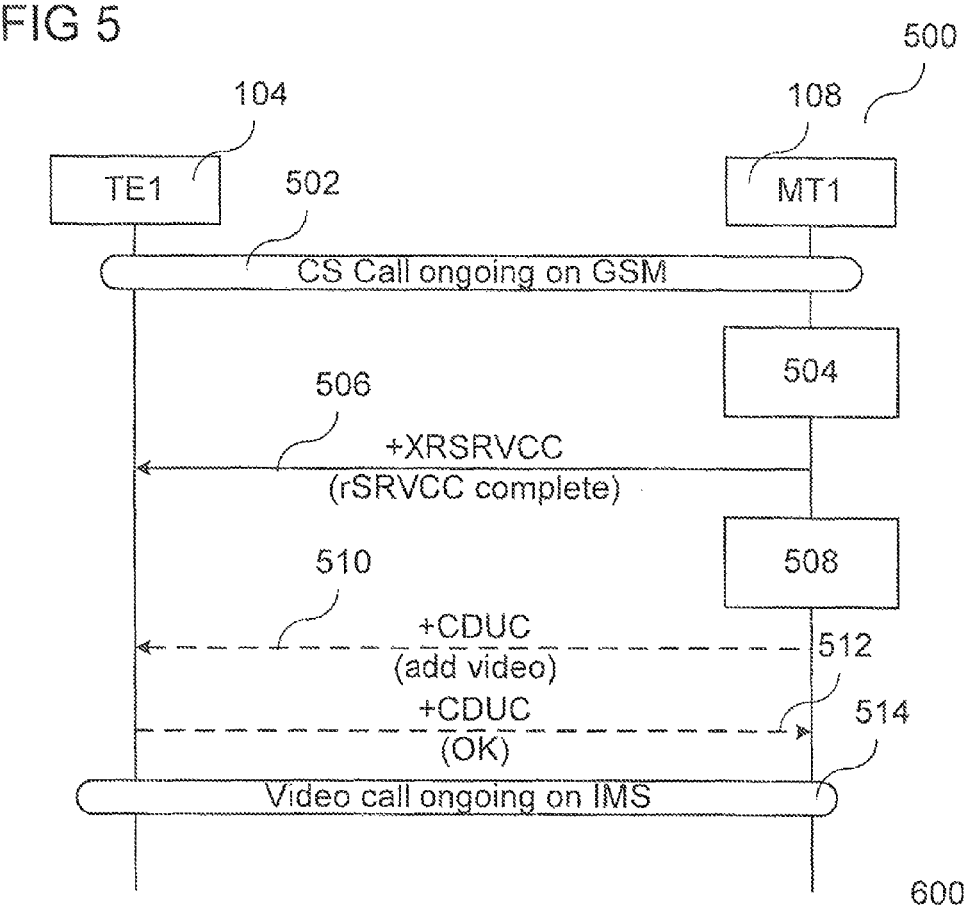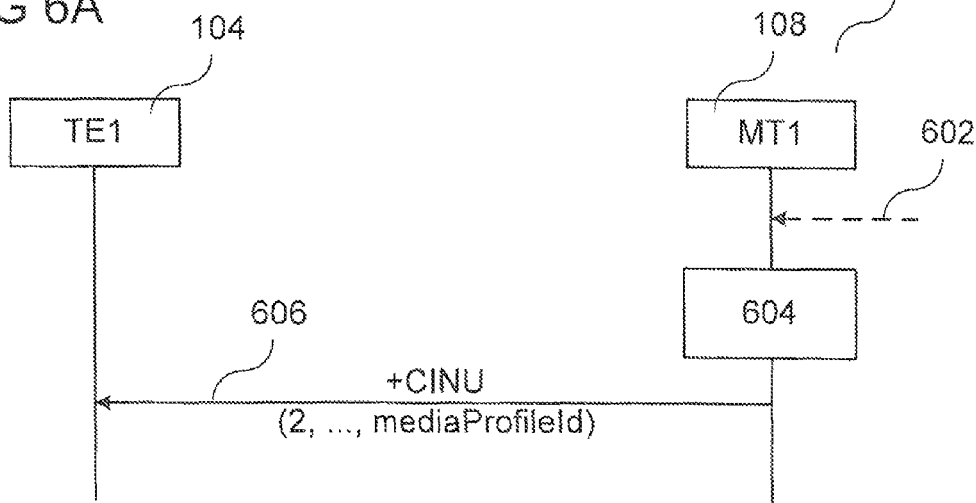

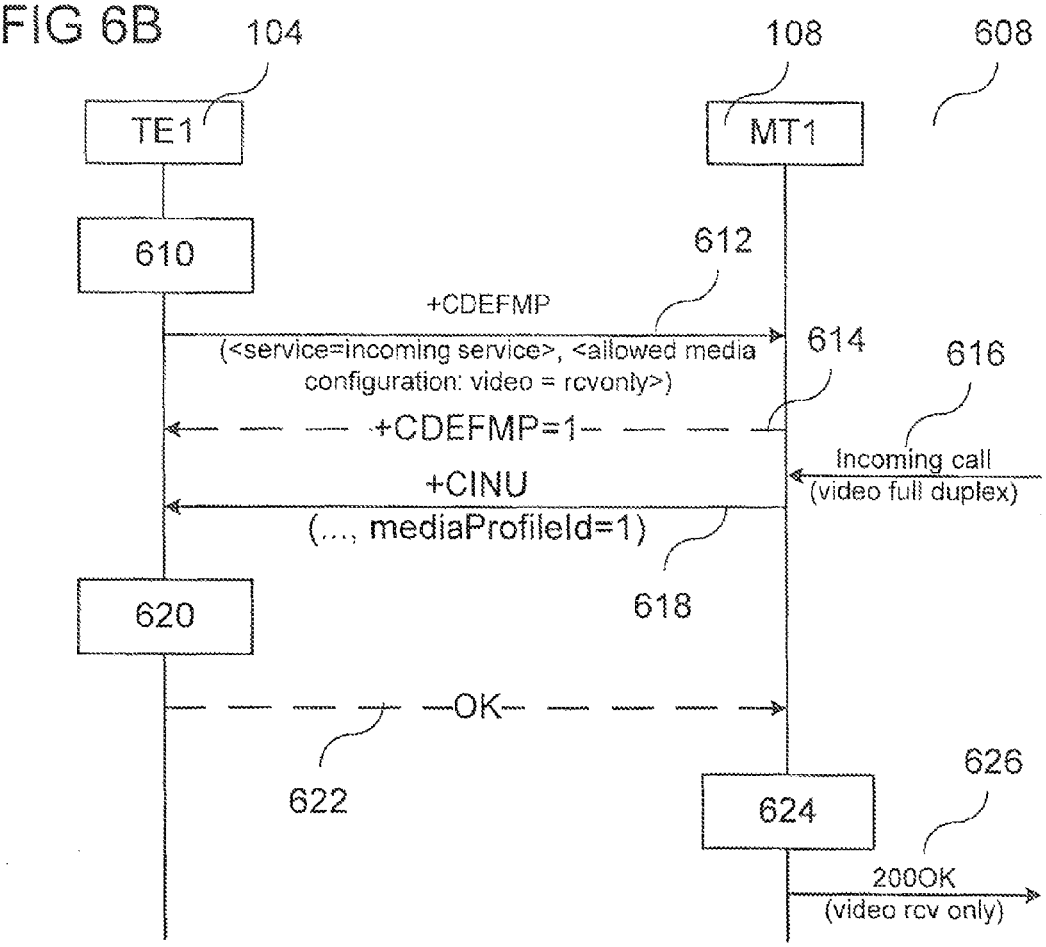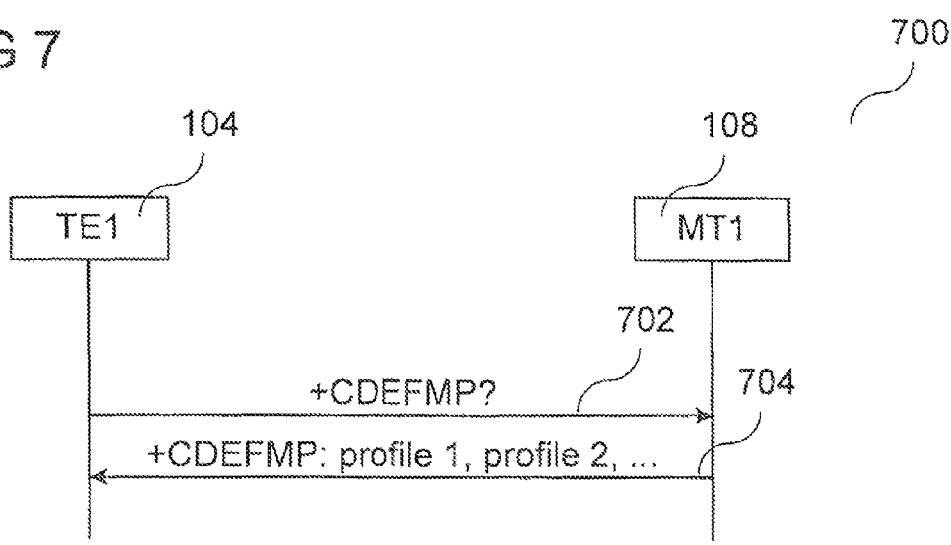

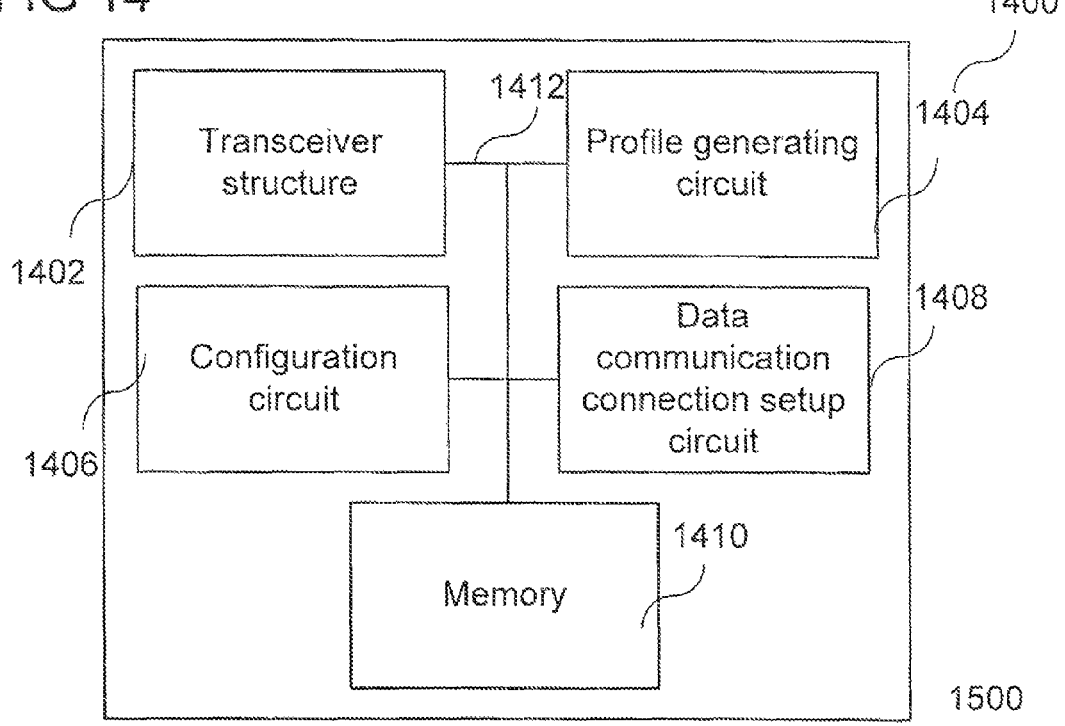
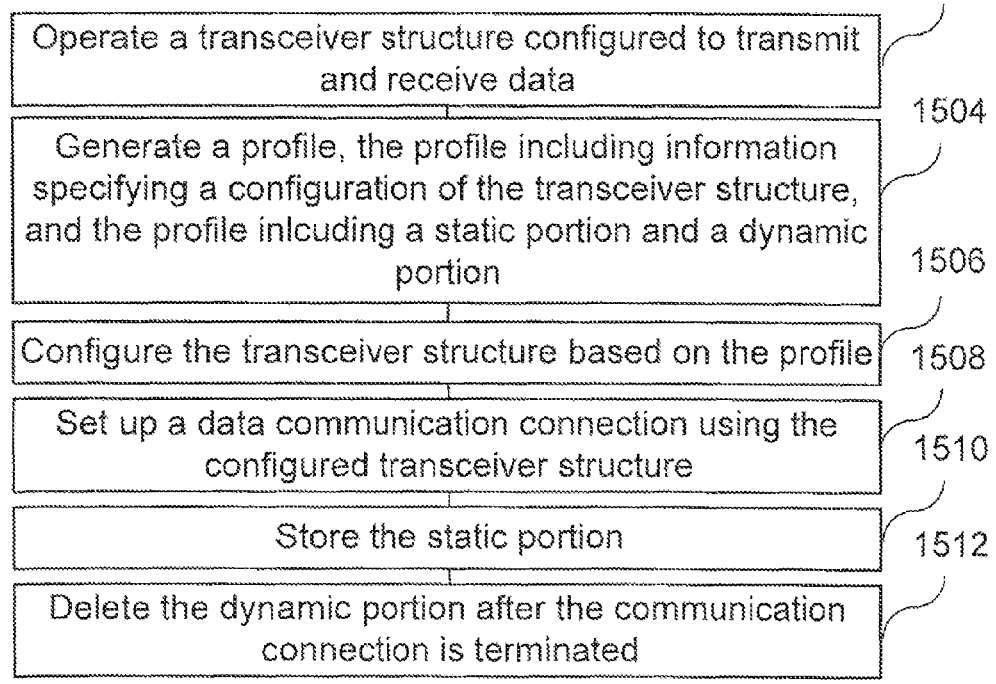

US 9,144,110 B2

MODEM DEVICES, APPLICATION PROCESSORS, COMMUNICATION DEVICES, METHODS FOR CONTROLLING A MODEM DEVICE, METHODS FOR CONTROLLING AN APPLICATION PROCESSOR, AND METHODS FOR CONTROLLING A COMMUNICATION DEVICE

RELATED APPLICATIONS

This application is a continuation of U.S. application Ser. No. 13/977,163, which was filed on Jun. 28, 2013, and which is incorporated by reference in its entirety. Application Ser. No. 13/977,163 is a national stage entry according to 35 U.S.C. §371 of PCT application No. PCT/IB2012/002293 filed on Sep. 17, 2012, and is also incorporated by reference in its entirety.

TECHNICAL FIELD

Aspects of this disclosure relate generally to modem devices, application processors, communication devices, methods for controlling a modem device, methods for controlling an application processor, and methods for controlling a communication device.

BACKGROUND

Mobile terminations (MT; for example modem hardware including senders and receivers for inter device communications) may be controlled by terminal equipment (TE; for example hardware interacting with end users and including application processors and means for user interaction) through AT commands. However, it may be cumbersome to control the MT using long AT commands.

SUMMARY

A modem device may be provided. The modem device may include: a transceiver structure configured to transmit and receive data using at least one of a plurality of communication technologies; a memory configured to store a profile, the profile including or being information specifying a configuration of the transceiver structure for each communication technology of the plurality of communication technologies; and an application processor interface, wherein the modem device is configured to receive from an application processor a command for configuring the transceiver structure through the application processor interface. The command may include or may be an instruction to the modem device to configure the transceiver structure according to the profile.

A method for controlling a modem device may be provided. The method may include: operating a transceiver structure configured to transmit and receive data using at least one of a plurality of communication technologies; storing a profile, the profile including or being information specifying a configuration of the transceiver structure for each communication technology of the plurality of communication technologies; and receiving from an application processor a command for configuring the transceiver structure; wherein the command includes or is an instruction to the modem device to configure the transceiver structure according to the profile.

An application processor may be provided. The application processor may include: a modem device interface, wherein the application processor is configured to send to a modem device a command for configuring a transceiver structure of the modem device through the modem device interface, the transceiver structure configured to transmit and receive data using at least one of a plurality of communication technologies. The command may include or may be information of a profile, the profile including or being information specifying a configuration of the transceiver structure for each communication technology of the plurality of communication technologies.

A method for controlling an application processor may be provided. The method may include: sending to a modem device a command for configuring a transceiver structure of the modem device, the transceiver structure configured to transmit and receive data using at least one of a plurality of communication technologies. The command may include or may be information of a profile, the profile including or being information specifying a configuration of the transceiver structure for each communication technology of the plurality of communication technologies.

A modem device may be provided. The modem device may include: a transceiver structure configured to transmit and receive data; a service request receiver configured to receive a service request requesting a communication service using the transceiver structure; a profile generating circuit configured to generate a profile, the profile including or being information specifying a configuration of the transceiver structure, based on the received service request; and a memory configured to store the profile.

A method for controlling a modem device may be provided. The method may include: operating a transceiver structure configured to transmit and receive data; receiving a service request requesting a communication service using the transceiver structure; generating a profile, the profile including or being information specifying a configuration of the transceiver structure, based on the received service request; and storing the profile.

A modem device may be provided. The modem device may include: a transceiver structure configured to transmit and receive data; a profile generating circuit configured to generate a profile, the profile including or being information specifying a configuration of the transceiver structure, and the profile including or being a static portion and a dynamic portion; a configuration circuit configured to configure the transceiver structure based on the profile; a data communication connection setup circuit configured to set up a data communication connection using the configured transceiver structure; and a memory configured to store the static portion. The modem device may be configured to delete the dynamic portion after the communication connection is terminated.

A method for controlling a modem device may be provided. The method may include: operating a transceiver structure configured to transmit and receive data; generating a profile, the profile including or being information specifying a configuration of the transceiver structure, and the profile includes or is a static portion and a dynamic portion; configuring the transceiver structure based on the profile; setting up a data communication connection using the configured transceiver structure; storing the static portion; and deleting the dynamic portion after the communication connection is terminated.

A modem device may be provided. The modem device may include: a transceiver structure configured to transmit and receive data; a memory configured to store a profile, the profile including or being information specifying a configuration of the transceiver structure; a configuration circuit configured to configure the transceiver structure based on the profile; a data communication connection setup circuit configured to set up a data communication connection using the configured transceiver structure; an application processor interface, wherein the modem device is configured to receive from an application processor a command including or being an instruction to the modem device to amend the profile through the application processor interface; and a reconfiguration circuit configured to change the configuration of the transceiver structure based on the amended profile (or based on the command) while the data communication connection is established.

A method for controlling a modem device may be provided. The method may include: operating a transceiver structure configured to transmit and receive data; storing a profile, the profile including or being information specifying a configuration of the transceiver structure; configuring the transceiver structure based on the profile; setting up a data communication connection using the configured transceiver structure; receiving from an application processor a command including or being an instruction to the modem device to amend the profile; and changing the configuration of the transceiver structure based on the amended profile (or based on the command) while the data communication connection is established.

A modem device may be provided. The modem device may include: a transceiver structure configured to transmit and receive data; a memory configured to store a profile, the profile including or being information specifying a configuration of the transceiver structure; a configuration circuit configured to configure the transceiver structure based on the profile; a data communication connection setup circuit configured to set up a data communication connection using the configured transceiver structure; and an application processor interface, wherein the modem device is configured to receive from an application processor a first command including or being an instruction to amend the profile and a second command for reconfiguring the transceiver structure based on the amended profile (or based on the first command) through the application processor interface. The modem device may further be configured to keep the configuration of the transceiver structure until at least one of the reception of the second command and a termination of the data communication connection.

A method for controlling a modem device may be provided. The method may include: operating a transceiver structure configured to transmit and receive data; storing a profile, the profile including or being information specifying a configuration of the transceiver structure; configuring the transceiver structure based on the profile; setting up a data communication connection using the configured transceiver structure; receiving from an application processor a first command including or being an instruction to amend the profile and a second command for reconfiguring the transceiver structure based on the amended profile (or based on the first command); and keeping the configuration of the transceiver structure until at least one of the reception of the second command and a termination of the data communication connection.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 3A shows a flow diagram illustrating a first alternative for media profile modification and call modification;

FIG. 3B shows a flow diagram illustrating a second alternative for media profile modification and call modification;

FIG. 5 shows a flow diagram illustrating media reconfiguration following intersystem change;

FIG. 6A shows a flow diagram illustrating temporary media profile creation at an incoming call;

FIG. 6B shows a flow diagram illustrating an incoming call with predefined media profile;

FIG. 7 shows a flow diagram illustrating listing of MT (mobile termination) predefined profile(s) or currently configured profile(s);

FIG. 14 shows a modem device for profiles with a static portion and a dynamic portion;

FIG. 15 shows a flow diagram illustrating a method for controlling the modem device of FIG. 14;

DETAILED DESCRIPTION

Figure 1:
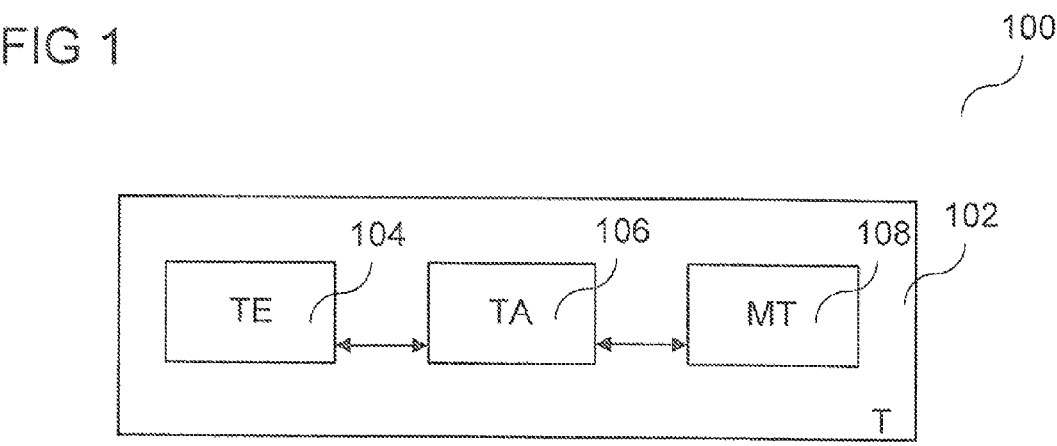
FIG. 1 shows an architecture of a mobile device.

The following detailed description refers to the accompanying drawings that show, by way of illustration, specific details and aspects of the disclosure in which various embodiments may be practiced. These aspects of the disclosure are described in sufficient detail to enable those skilled in the art to practice various embodiments. Other aspects of the disclosure may be utilized and structural, logical, and electrical changes may be made without departing from the scope of the disclosed embodiments. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A communication device communication device (which may also be referred to as end device) may be a wired communication device. A communication device may be a radio communication device. A radio communication device may be an end-user mobile device (MD) or a mobile phone. A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile equipment (ME), a phone, a mobile station (MS) or an advanced mobile station (advanced MS, AMS), for example in accordance with IEEE 802.16m.

The modem device may include a memory which may for example be used in the processing carried out by the modem device. The application processor may include a memory which may for example be used in the processing carried out by the application processor. The communication device may include a memory which may for example be used in the processing carried out by the communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

Media configuration on IMS (IP (Internet protocol) multimedia subsystem) may be complex (for example multiple audio and video format, service upgrade/downgrade, unidirectional/bi-directional may be desired to be handled). In case the user application and the IMS client are located on separate units (for example separate processors, for example laptop and modem), there is no standardized way and easy to use mechanism to configure remotely the media to be applied by the IMS client at service setup or at service modification.

Service initiated over IMS may be continued over legacy circuit switched (CS) or vice versa. During mobility with service continuity the media may be kept or modified (for example downgraded or upgraded). Up to now, there is no possibility to describe a media globally including the conversion to be applied in case of service domain modification.

IMS communication service calls may be controlled via the Session Initiation Protocol (SIP) and Session Description Protocol (SDP).

FIG. 1 shows an architecture 100 of a communication device, for example a mobile phone architecture. A mobile phone 102 (which may be also referred to as T) may include a terminal equipment TE 104, a terminal adapter TA 106, and a mobile termination MT 108.

Mobile terminations (MT; for example modem hardware including senders and receivers for inter device communications), which may also be referred to as modem devices, may be controlled by terminal equipment (TE; for example hardware interacting with end users and including application processors and means for user interaction through AT commands.

AT commands may be used for controlling voice/data (for example video) calls as non-IMS services. AT commands allow to determine the data rate and the class of the device which is used by the ME (mobile equipment) to determine if video calls shall be setup on legacy CS.

New AT commands may be defined by 3GPP to be used by IMS services.

Disadvantages may be: existing AT commands may be specify media to be used by IMS services; existing AT commands may be specify media quality for IMS services; existing AT commands may not be used to configure media support for incoming calls; existing AT commands may not be used to control the media for incoming calls; existing AT commands may not allow to reuse a media configuration for multiple IMS calls (for example: if an IMS call is set up, a long list of parameters for the media configuration shall be given. Each time a call is dialed, the same long list of parameters may be provided, even if the same configuration is used. If some dialup tools are used, such as HyperTerminal, it may be very inconvenient for users to setup an IMS call); existing AT commands may not allow to specify media configurations by a single parameter; existing AT commands may not allow a partial modification of a media configuration (for example instead the complete configuration may have to be provided for modification); no media profile may be provided independent of the technology (IMS or circuit switched) for determining device behavior following service continuity or at call setup; in mobility use case, there may be no possibility to control the media downgrade/upgrade following service continuity.

A profile may include parameter values for setting up a transceiver structure. A profile may be defined by a structure of the profile including parameters to be set for the transceiver structure. The profile may then include the parameter values according to the parameter structure.

Devices and methods may be provided which introduce the concept of media profiles, for example as follows:
  a media profile may contain all information related to a media configuration;
  a media profile may contain information applicable to multiple technologies (IMS, CS) or conversion rules when moving from one technology to another; and
  a media profile is persistent and can be re-used by subsequent call sessions.

When setting up or modifying a call session, a reference may be made to an already defined media profile. The media profile may also be given as part of the service command itself.

Using these device and methods:

Indications for media configurations may be short;

Media configuration may allow to take into account future additional parameters related to media session description;

Media may be configured for multiple technologies to ease the service continuity in mobility scenario;

Media configurations may be modified;

Default and predefined media configurations may be defined;

Media configurations may be reused for subsequent call sessions;

Indications for media configurations of incoming calls may be short;

A media profile may allow a predefined behavior for incoming calls when determining which media configuration is to be accepted/rejected without requiring user interaction; and Ongoing communications may be modified with a short indicator or with a short amount of data in case of partial media profile modification.

Devices and methods may be provided which introduce media profiles and use media profiles to configure call sessions. Media profiles may be modified. Media profiles may be reused for multiple call sessions. Media profiles may cover multiple technologies and corresponding media conversion in case of mobility scenarios.

Media profiles may be introduced. A media profile may include all information related to the description of the media in a session such as audio codec information, video codec information, codec preference, quality of service required, media connection information (for example information indicating whether to send and/or receive data, for example port description). The content of the media profile may be extended in the future to any new possible media configuration.

The media profile may provide information related to multiple technologies (for example IMS and legacy CS) for example:

Media information relevant for all technologies (such as media type (audio, video));

Media information relevant for specific technologies. This may be defined for every technology. Depending on the technology used, the corresponding media description may be used; and/or Conversion rules in case of intersystem change (which may be from codec change to media service automatic downgrade or upgrade);

The media profile may be identified with a unique identifier. This reference may be used by commands (to setup and modify IMS or other services) to specify the media configuration to be applied.

The identifier of the media profile may:

be set by the TE at media profile creation; or or be indicated by the MT with a successful media creation response The media profile may be created, deleted and modified. It may be persistent information that may be reused for subsequent call sessions.

New commands for a communication end terminal may be defined to create, get, modify and delete the media profile. Additional commands may be defined to define or modify a single parameter of the media profile.

The media profile may be either created initially before setting up a call session or may be created directly with the service request command itself.

Predefined profiles may be pre-provisioned by manufacturers.

The media profile may be constituted of two parts:

a static part, which may also be modified (on a long time scale);

a dynamic part resulting from the media negotiation with the network, wherein the dynamic part may be deleted at call session release.

For example, at least one of the following may be provided regarding the media profile handling may be provided:

the media profile may be bound to one active call session. It may not be reused by a second call session if the first session is still active. A second profile may be determined for the second call session running in parallel. Same identifier may be used to reference the call session and the corresponding media profile.

the media profile may be reused by multiple simultaneous call sessions. In this case, a separate ID may be used for the call session and for the media profile. In this case, the dynamic part of the media profile may be defined per call session and may be referred with the call session identifier.

The modification of the media configuration may be performed in different ways:

The modification of the media profile itself may lead to an immediate change of the media configuration of the active call. In this case, sending the command to modify the profile may lead to the call modification.

The media profile may be updated independently of the active call session. In this case, a first command may be sent to modify the media profile. The media configuration of the active call session may not be changed. Then another command may be sent if the modified profile shall be applied for the active call.

The media profile may be configured to be applicable only for outgoing calls, only for incoming calls or both.

The media profile may be used to predetermine a device's behavior for incoming calls. A media profile may be configured to list down the range of allowed configurations for incoming calls. When a call is being received, only the media configuration allowed by the media profile will be accepted. The user or phone application may be restricted to the allowed incoming call configuration range. One example of this usage may be the Bluetooth headset or the hands-free set in a car. In such cases, a media profile may be configured applicable for incoming calls where the usage of video is disabled or configured in receive only mode. The user or phone application could then only accept the call without having to take care of the media configuration.

In the following, examples for media profile definition will be described.

In the following, a command to configure the media profile, media attributes are listed as parameters will be described.

As an example, the media configuration may be purely string based on SDP model or new string template can be defined if not covered by SDP.

For example, the command may be as follows:
+CDEFMP=[<mediaparam1>, [<mediaparam2> . . . , [<mediaparamx>, [<mediaparamy>, . . . ]]]]

In this, "+CDEFMP" may be the identifier of the command, and "madiaparam1", "mediaparam2", "mediaparamx", and "mediaparamy" may be parameters for defining the profile.

For instance for 3G video call, a new string may be defined: "mod=VideoCs speed=130" for a video call at 28800 bps (multimedia) on CS.

As an example, some structure may be given in the media profile definition command. The command may be not only string based.

For example, the command may be as follows:
+CDEFMP=[<mediaList>, [<mediaType>, <dom>, <paramList>, [<mediaparam1>, [<mediaparam2> . . . ]]], [<mediaType><dom>, <paramList>, [<mediaparam1>, [<mediaparam2> . . . ]]]

<mediaList> may be or may include an integer type and may indicate the number of media type configured.

<mediaType> may indicate the type of the media (audio, video, text . . . ), and may for example use the following values:
- 0 for audio;
- 1 for video; and
- 2 for text.

<dom> may be or may include an integer type (or an enumeration), and may indicate the domain of applicability of the media (for example generic, technology specific, default), and may for example use the following values:
- 0 for generic (for example applicable on all technologies if supported);
- 1 for legacy CS (circuit switched);
- 2 for GSM (global system for mobile communications) CS;
- 3 for UMTS (universal mobile telecommunications system) CS;
- 4 for IMS (internet protocol multimedia subsystem);
- 5 for IMS over HSPA (high speed packet access);
- 6 for IMS over LTE (long term evolution); and
- 7 for a default: minimal configuration if the generic configuration not supported on the current technology.

<paramList> may be a number of media configuration parameters for a specific media type.

A response to the command may indicate the media profile identifier ID:
+CDEFMP:<ID>

Regarding the media configuration <mediaParam> itself, several alternatives may be possible to configure the media parameters:
either the media profile may be based on the direct SDP sequence, for example:
<media><media><media> where <media> is a SDP description: m= . . . , a= . . . .

For instance: an audio call with 16-bit linear encoded stereo audio sampled at 16 kHz may be indicated by:
+CDEFMP="m=audio 49232 RTP/AVP 98", "a=rtpmap: 98 L16/16000/2"

or each parameter is described individually and independently of SDP, for example:

```
<media type>:
- 1: audio
- 2: video;
- 3: text
<media format>:
- <codec>: enumeration of codec
- ...
- <clockrate>:
- .....
<port>: value, range (string)
<protocol>:
- 1: UDP
-                        2: RTP/AVP
-                        3: RTP/SAVP
-                        ....
<bandwidth>: optional
<mode>:
```

```
-                        1: send/received;
-                        2: receive only;
-                        3: send only.
.....
```

For example, the parameter of media type=<audio><port=49232><protocol=RTP/AVP><codec=L16><clock rate=16000> may be included in the following command:
+CDEFMP=1,"49232",2,22,"16000"

The media parameter may either be a fixed value or a list/range of supported values.

A command to get the list of currently defined media profiles may be as follows:
+CDEFMP?

A return value may be either a list of identifiers or the complete profile definition (using format described above).

A command to get the ME capabilities may be as follows:
+CDEFMP=?

This command may allow retrieving all the media configurations supported by the ME. The return value may include or may be the range of the supported media configurations.

A command to get the definition of a profile may be as follows:
+CGETMP=[<ID>]

A command to modify a profile may be as follows:
+CMODMP=[<ID>, [<mediaList>, [<mediaType>, <dom>, <mod>, [ . . . ]]]]

<mod> may indicate whether the given media configuration is added, modified or removed:
1: addition of a media configuration
2: modification of a media configuration
3: removal of a media configuration As an example, a video part can be modified for the profile with identifier 2 by the following command:
+CMODMP=2, 1, 1, 0, 1, [ . . . ]

A command to modify a specific parameter of a profile may be defined.

A specific AT command may be defined to modify some specific parameter such as an audio codec, for example as follows:
+CMODCOD=[<ID>, <mediaType>, <dom>, <codec>]

Figure 2:
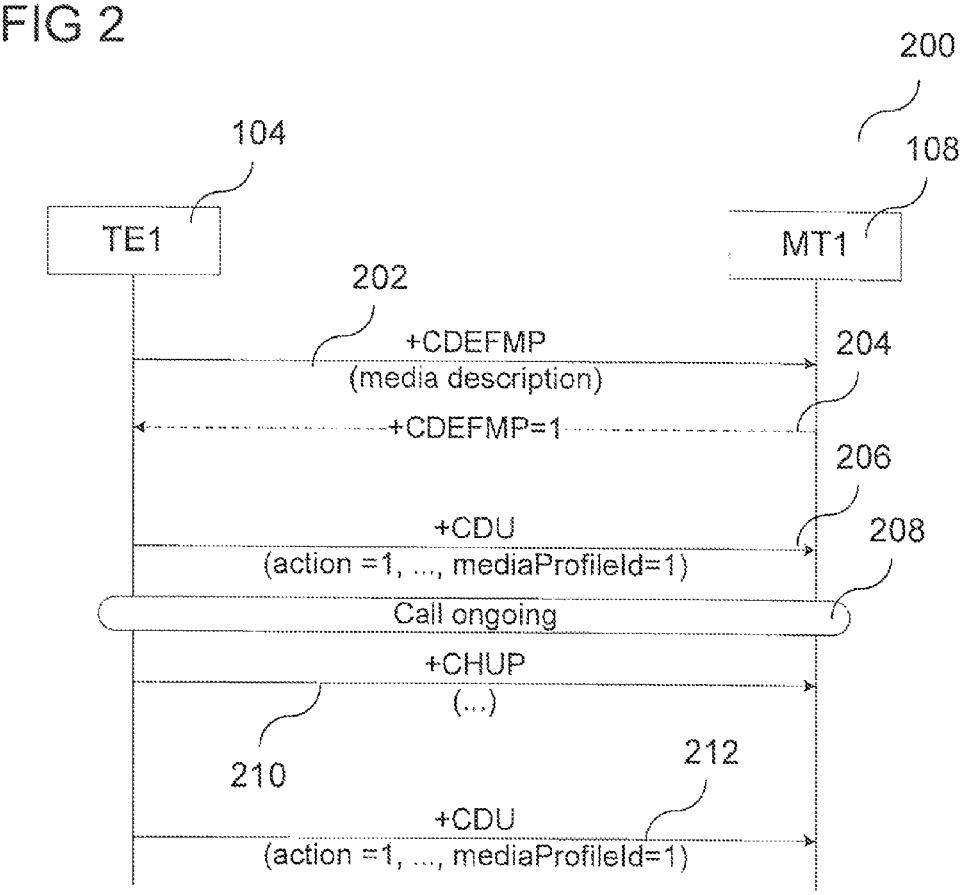
FIG. 2 shows a flow diagram illustrating media profile configuration and profile re-use in a subsequent call.

FIG. 2 shows a flow diagram 200 illustrating media profile configuration and profile re-use in a subsequent call. A flow of information between a terminal equipment TE1 (for example the TE 104 of FIG. 1) and a mobile termination MT1 (for example the MT 108 of FIG. 1) is shown. As shown in FIG. 2, the TE 104 may configure a media profile using the command +CDEFMP including the media description in 202. In 204, MT 108 may respond the ID of the generated profile with a +CDEFMP=1 (which may indicate that the ID is 1). Then when initiating the call, the TE simply may indicate the identifier of the media profile to use in the dial command (+CDU) in 206. The ME when setting up the call may use the media configuration described in the given media profile. The call may be going on in 208. After the call release (for example by a +CHUP command in 210), if the user wants to initiate another call to a different user but with the same media configuration (for instance video call), then the TE may send again the dial command (+CDU) with the identifier of the media profile in 212. There may be no need to configure the media again.

In the following, it will be described how the media profile may be modified leading to a change of the media configuration of the call.

FIG. 3A shows a flow diagram 300 illustrating a first alternative for media profile modification and call modification. A flow of information between a terminal equipment TE1 (for example the TE 104 of FIG. 1) and a mobile termination MT1 (for example the MT 108 of FIG. 1) is shown. The modification of the media profile (#1, in other words: the profile with ID 1) may immediately be taken into account by the MT 108 which may apply the new media configuration to the active call. For example, media profile #1 may be modified with addition of video by command 302. The MT 108 may modify the call according to the profile modification.

FIG. 3B shows a flow diagram 304 illustrating a second alternative for media profile modification and call modification. A flow of information between a terminal equipment TE1 (for example the TE 104 of FIG. 1) and a mobile termination MT1 (for example the MT 108 of FIG. 1) is shown. The media profile may be modified, but a subsequent command may initiated by the TE to indicate when the change has to be considered. For example, media profile #1 may be modified with addition of video by command 306, and the MT 108 may not modify the call upon receiving command 308. The modified profile may be considered upon explicit request by the TE 104, for example by a command 308 sent by the TE 104.

The TE 104 may also modify the call by pointing to another profile. For example, the media profile may not be modified, but the TE may initiate a command to modify the call and points to another profile (for example profile #2). This call may be modified according this new profile.

Figure 4A:
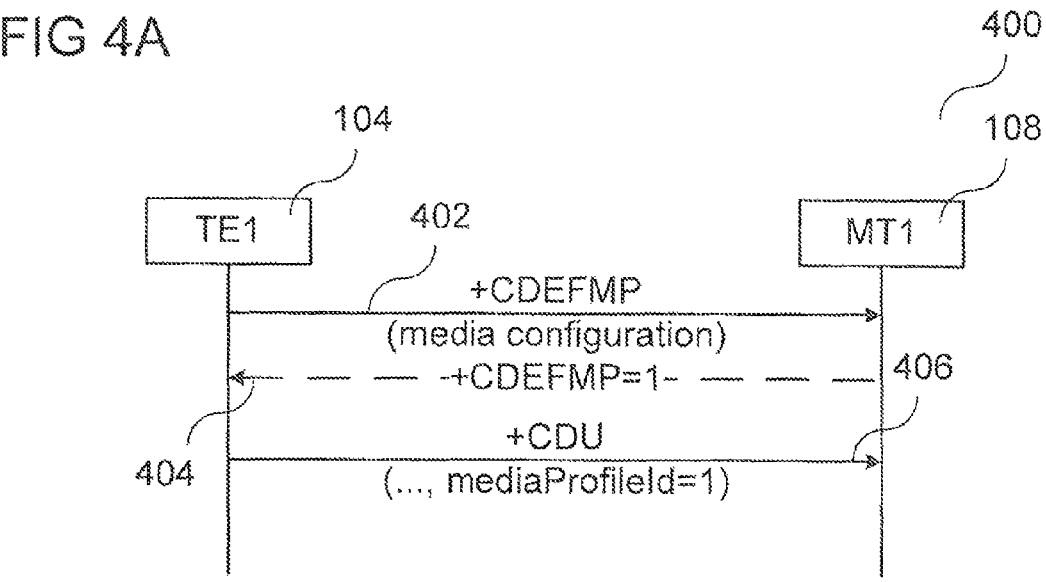
FIG. 4A shows a flow diagram illustrating a usage of technology specific part of the media profile based on the domain selection to setup the call.

FIG. 4A shows a flow diagram 400 illustrating a usage of technology specific part of the media profile based on the domain selection to setup the call. A flow of information between a terminal equipment TE1 (for example the TE 104 of FIG. 1) and a mobile termination MT1 (for example the MT 108 of FIG. 1) is shown. A media profile may be configured using technology specific configuration. For example, in 402 the TE 104 may send a command for configuring the media profile including video. The SDP description <m=video 49170/2 RTP/AVP 31> may be applicable over IMS and the additional description <mod=VideoCs speed=130> is applicable on 3G CS video call at 28800 bps. In 404, the MT 108 may indicate the ID of the generated profile as a response to the TE 104. For example, as SDP is being provided, this may also instruct the MT not to encode and decode the video media. Instead, the video RTP packets may be forwarded to the TE 104. The TE 104 itself may take care of encoding and decoding.

Upon call initiation by the TE 104 in 406, the MT 108 may do the domain selection to determine if the call shall be performed over CS or over IMS. The MT 108 may then apply the media configuration corresponding to the technology used to setup the call. For example, the TE 104 may initiate the service without bothering about the technology used.

After the MT 108 receives the command 406, the MT 108 may perform the domain selection, for example:
  if call setup on CS, CS part of the profile used: Video Call 28800 bps; and
  if call setup on IMS, IMS part of the profile used to configure the video call.

The MT 108 may configure the media base on the technology used without additional info from TE 104.

Figure 4B:
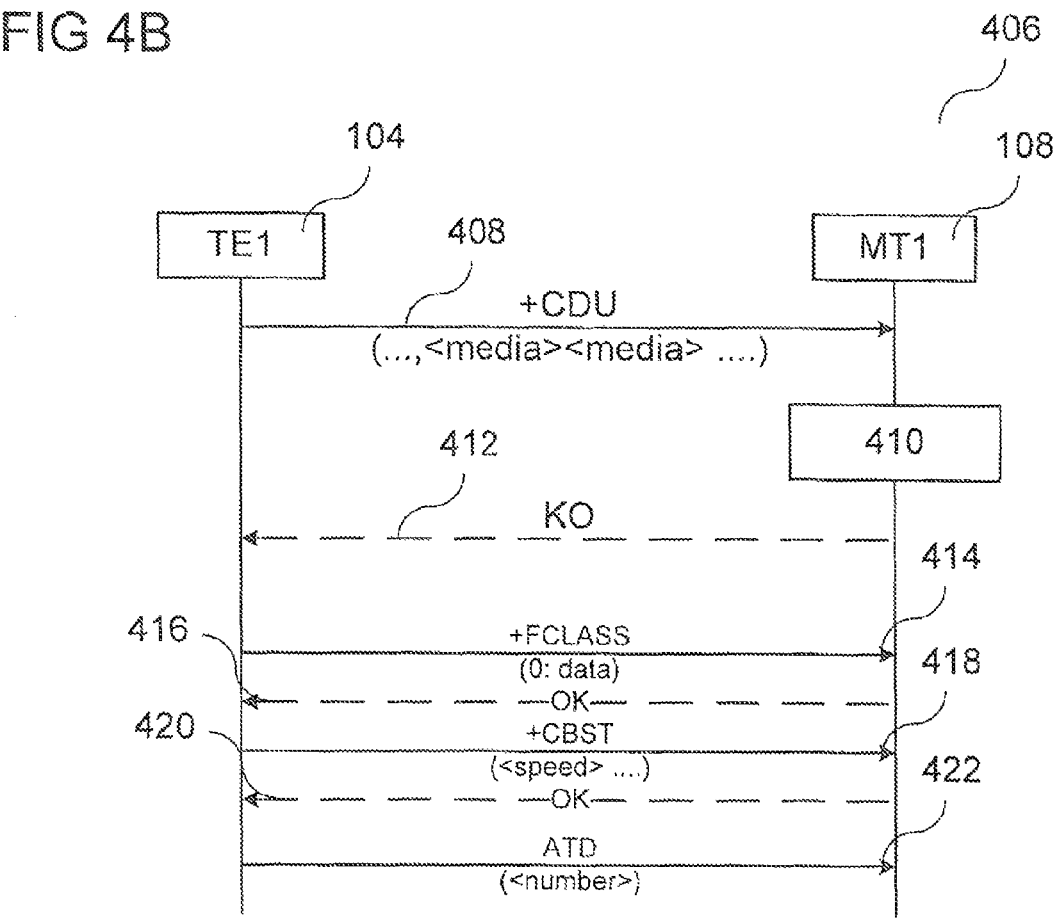
FIG. 4B shows a flow diagram illustrating multiple media configuration in case of domain selection conflict without the concept of media profile.

FIG. 4B shows a flow diagram 406 illustrating multiple media configuration in case of domain selection conflict without the concept of media profile. A flow of information between a terminal equipment TE1 (for example the TE 104 of FIG. 1) and a mobile termination MT1 (for example the MT 108 of FIG. 1) is shown. FIG. 4B shows the same use case shown in FIG. 4A, but shown with legacy commands. The TE may only configure and initiate a call over IMS in 408 (for example the TE 104 may desire to initiate a video call over IMS). If not successful due to intersystem change or any restriction in MT 108 that does not allow the setup of the IMS call, the TE 104 may configure and initiate again the video call on the CS domain. In 410, the MT 108 may determine that the MT 108 may not establish the call over IMS due to network not supporting IMS voice or UE not supporting IMS voice on the current RAT. In 412, a KO signal may be sent indicating this. This may indicate to the TE 104 that an IMS call is failed, and that the TE 104 has to configure the FCLASS and the bearer service type to initiate the video call on 3G (third generation) CS. In 414, 416, 418, and 420, the CS video call may be configured. In 422, the TE 104 may send a dial command for the CS call to the TE 108. After this, the MT 108 may setup the video call on the CS domain.

FIG. 5 shows a flow diagram 500 illustrating media reconfiguration following intersystem change. A flow of information between a terminal equipment TE1 (for example the TE 104 of FIG. 1) and a mobile termination MT1 (for example the MT 108 of FIG. 1) is shown. A call may be initiated on legacy CS on GSM and may be going on in 502. Despite video is configured in the profile, it may not be used as the GSM doesn't support video call. In 504, the communication device including the MT 108, for example an UE, may move to LTE coverage. A reverse SRVCC (Single Radio Voice Call Continuity) may be performed in 506 and the call session may be transferred to IMS. In 508, after intersystem change to IMS, the MT1 108 may directly enable video as video may already be configured in the media profile. No additional media configuration may be required. Very short interaction between TE 104 and ME 108 may be provided. The video is automatically started on IMS as it may be configured in the media profile. No interaction with TE 104 may be required. For example, the MT 108 may send an indication to the TE (+CDUC) in 510 to inform that a media reconfiguration will take place. The TE may acknowledge in 512 or may request to keep the initial configuration. There may be no need to provide the media configuration again as it was already configured in the profile. In 514, the video call may be going on on IMS.

FIG. 6A shows a flow diagram 600 illustrating temporary media profile creation at an incoming call. A flow of information between a terminal equipment TE1 (for example the TE 104 of FIG. 1) and a mobile termination MT1 (for example the MT 108 of FIG. 1) is shown. A service request (for example an incoming call) may arrive at the MT 108 in 602. In 604, a temporary media profile may be created (for example a dynamic part (or dynamic portion) of the media profile). FIG. 6A may shows the case where the MT 108 indicated the incoming call to the TE 104 by the command +CINU in 606. In the incoming call indication, the identifier of the media profile created may be given. For example, the media profile or multimedia configuration may be given. The TE 104 may then modify the media configuration in modifying the media profile (for example before accepting the call or later during the call session).

For devices without touch-screen or in case of Bluetooth headset usage or similar use cases, it may be difficult to offer a multiple choice for the acceptance of a call. If the device offers a single button/key press to accept the call, the user may not be offered the possibility to modify the media configuration of the incoming call. In this case, a media profile may be configured in advance to indicate what the allowed media configurations are. The MT may then decide based on the media profile, which media configuration to apply for the incoming call. The user task may then be limited to accept the incoming call and the user does not need to handle the modification of the media configuration.

FIG. 6B shows a flow diagram 608 illustrating an incoming call with predefined media profile. A flow of information between a terminal equipment TE1 (for example the TE 104 of FIG. 1) and a mobile termination MT1 (for example the MT 108 of FIG. 1) is shown. In 610, a Bluetooth headset may be plugged in or "in car" usage may be started or a single button device may be present. In 612, the TE 104 may send a command for configuring a media profile with allowed media capability for incoming call, for example, video call capability may be limited to receive only. In 614, MT 108 may respond with the ID of the generated profile. In 616, an incoming call may arrive at MT 108. In 618, MT 108 may report the incoming call to the TE 104, including an identifier of a suitable profile. In 620, a user may simply press accept, and the media configuration may be handled by the MT 108 based on the media profile. In 622, the TE 104 may send an OK signal indicating that the user accepts. In 624, the MT 108 may accept the call but may allow only video in receive mode as described in the profile, and may send a corresponding 2OOOK signal in 626.

FIG. 7 shows a flow diagram 700 illustrating listing of MT (mobile termination) predefined profile(s) or currently configured profile(s). A flow of information between a terminal equipment TE1 (for example the TE 104 of FIG. 1) and a mobile termination MT1 (for example the MT 108 of FIG. 1) is shown. An interrogation command 702 like described above may be used to request the list of configured media profiles in the MT. This can be either pre-provisioned profiles by the MT or profile(s) already configured by the TE. The MT 108 may offer (or inform) pre-provisioned profiles based on its capabilities (for instance one for voice call, one for video call) in 704. In other words, according to FIG. 7, the TE 104 may retrieve predefined profile in the MT 108, if any.

Figure 8:
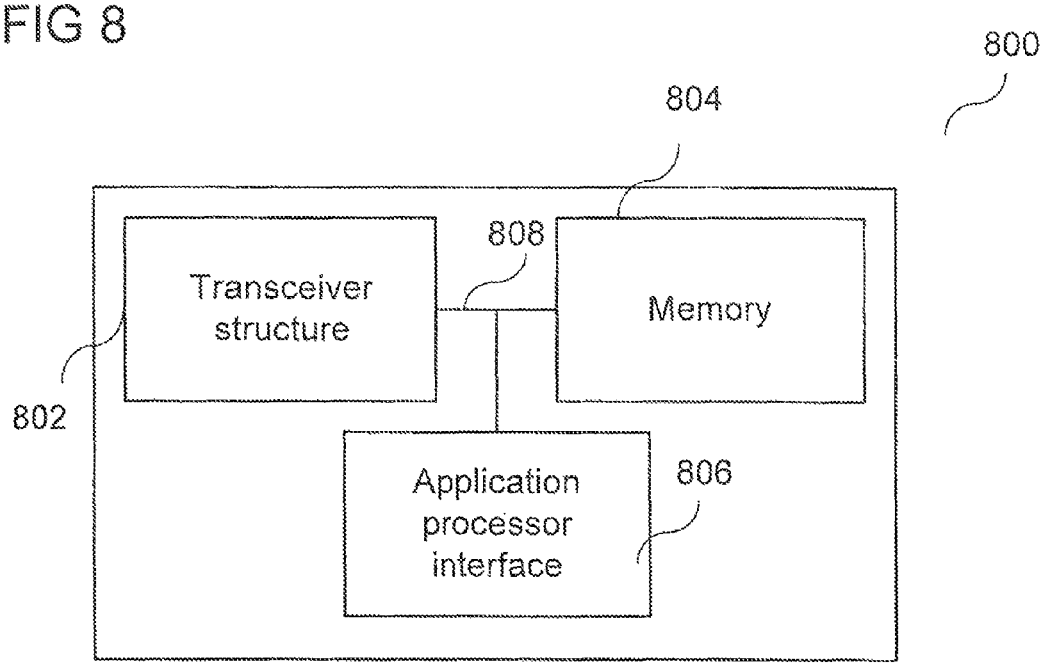
FIG. 8 shows a modem device for a plurality of communication technologies.

FIG. 8 shows a modem device 800. The modem device 800 may include a transceiver structure 802 configured to transmit and receive data using at least one of a plurality of communication technologies. The modem device 800 may further include a memory 804 configured to store a profile. The profile may include or may be information specifying a configuration of the transceiver structure 802 for each communication technology of the plurality of communication technologies. The modem device 800 may further include an application processor interface 806. The modem device may be configured to receive from an application processor (not shown) a command for configuring the transceiver structure 802 through the application processor interface. The command may include or may be an instruction to the modem device to configure the transceiver structure 802 according to the profile. The transceiver structure 802, the memory 804, and the application processor interface 806 may be coupled with each other, e.g. via a connection 808, for example an optical connection or an electrical connection, such as e.g. a cable or a computer bus or via any other suitable electrical connection to exchange electrical signals.

The transceiver structure 802 may include or may be a transceiver.

The transceiver structure 802 may include or may be a plurality of transceivers.

Each of the plurality of transceivers may be configured to transmit and receive data using one communication technology of the plurality of communication technologies.

Each communication technology of the plurality of communication technologies may include or may be at least one of the following: a circuit switched communication technology; a legacy circuit switched communication technology; a global system for mobile communications circuit switched communication technology; a universal mobile telecommunications system circuit switched communication technology; an internet protocol multimedia subsystem communication technology; an internet protocol multimedia subsystem over high speed packet access communication technology; and an internet protocol multimedia subsystem over long term evolution communication technology.

The command may include or may be an identifier of the profile.

The command may include or may be an AT command.

The modem device 800 may further be configured to receive from the application processor a command for generating the profile through the application processor interface 806.

The modem device 800 may further be configured to send to the application processor an identifier of the generated profile through the application processor interface 806.

The modem device 800 may further be configured to receive from the application processor a command requesting to send information about the profile to the application processor through the application processor interface 806.

The modem device 800 may further be configured to receive from the application processor a command for amending the profile through the application processor interface 806.

The profile may include or may be information indicating a type of media to be received by or sent from the transceiver structure.

The type of media may include or may be at least one of the following: audio data; video data; and text data.

A communication device may be provided. The communication device may include the modem device shown in FIG. 1.

Figure 9:
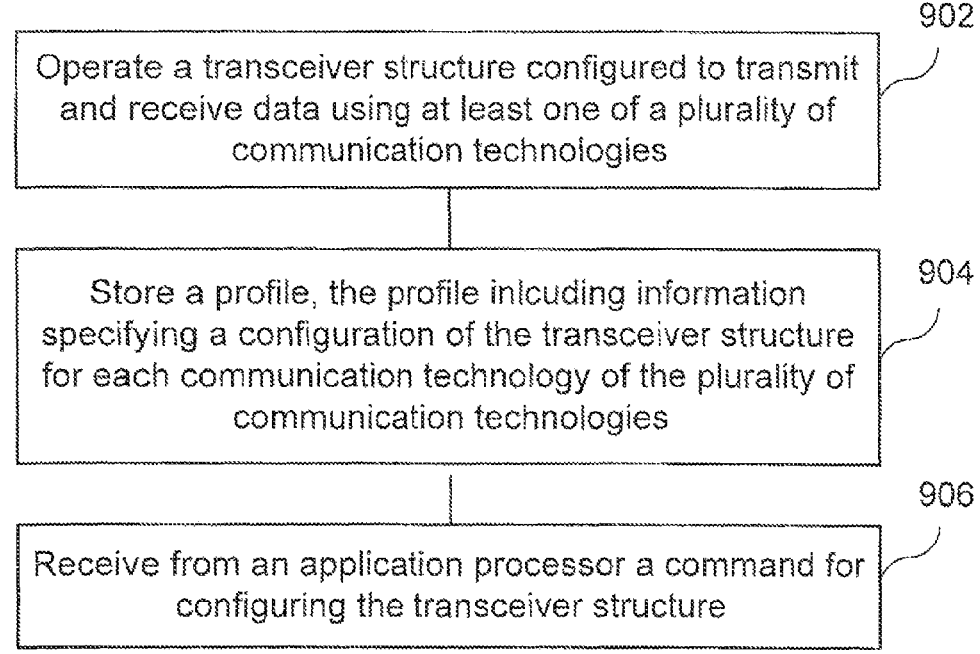
FIG. 9 shows a flow diagram illustrating a method for controlling the modem device of FIG. 8.

FIG. 9 shows a flow diagram 900 illustrating a method for controlling a modem device. In 902, the modem device may be operating a transceiver structure configured to transmit and receive data using at least one of a plurality of communication technologies. In 904, a memory of the modem device may store a profile. The profile may include or may be information specifying a configuration of the transceiver structure for each communication technology of the plurality of communication technologies. In 906, the modem device may receive from an application processor a command for configuring the transceiver structure through an application processor interface of the modem device. The command may include or may be an instruction to the modem device to configure the transceiver structure according to the profile.

The transceiver structure may include or may be a transceiver.

The transceiver structure may include or may be a plurality of transceivers.

Each of the plurality of transceivers may be configured to transmit and receive data using one communication technology of the plurality of communication technologies.

Each communication technology of the plurality of communication technologies may include or may be at least one of the following: a circuit switched communication technology; a legacy circuit switched communication technology; a global system for mobile communications circuit switched communication technology; a universal mobile telecommunications system circuit switched communication technology; an internet protocol multimedia subsystem communication technology; an internet protocol multimedia subsystem over high speed packet access communication technology; and an internet protocol multimedia subsystem over long term evolution communication technology.

The command may include or may be an identifier of the profile.

The command may include or may be an AT command.

The modem device may receive from the application processor a command for generating the profile through the application processor interface.

The modem device may send to the application processor an identifier of the generated profile through the application processor interface.

The modem device may receive from the application processor a command requesting to send information about the profile to the application processor through the application processor interface.

The modem device may receive from the application processor a command for amending the profile through the application processor interface.

The profile may include or may be information indicating a type of media to be received by or sent from the transceiver structure.

The type of media may include or may be at least one of the following: audio data; video data; and text data.

A method for controlling a communication device may be provided. The method may include the method illustrated in FIG. 9.

Figure 10:
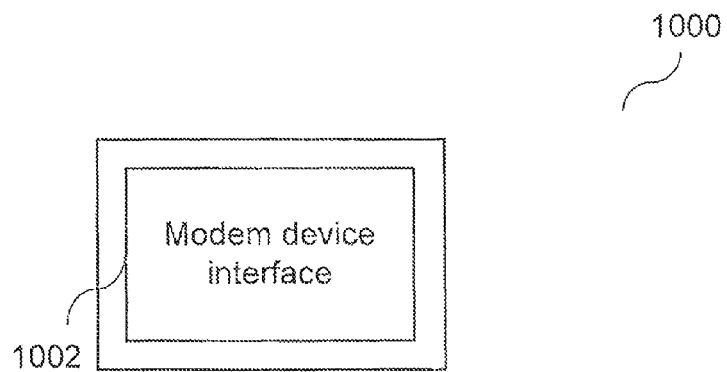
FIG. 10 shows an application processor for a plurality of communication technologies.

FIG. 10 shows an application processor 1000. The application processor 1000 may include a modem device interface 1002. The application processor 1000 may be configured to send to a modem device a command for configuring a transceiver structure of the modem device through the modem device interface 1002, the transceiver structure configured to transmit and receive data using at least one of a plurality of communication technologies. The command may include or may be information of a profile. The profile may include or may be information specifying a configuration of the transceiver structure for each communication technology of the plurality of communication technologies.

The command may include or may be an identifier of the profile.

The command may include or may be an AT command.

The application processor 1000 may further be configured to send to the modem device a command for generating the profile through the modem device interface 1002.

The application processor 1000 may further be configured to receive from the modem device an identifier of the generated profile through the modem device interface 1002.

The application processor 1000 may further be configured to send to the modem device a command requesting to send information about the profile to the application processor through the modem device interface 1002.

The application processor 1000 may further be configured to send to the modem device a command for amending the profile through the modem device interface 1002.

The profile may include or may be information indicating a type of media to be received by or sent from the transceiver structure.

The type of media may include or may be at least one of the following: audio data; video data; and text data.

A communication device may be provided. The communication device may include the application processor shown in FIG. 10.

Figure 11:
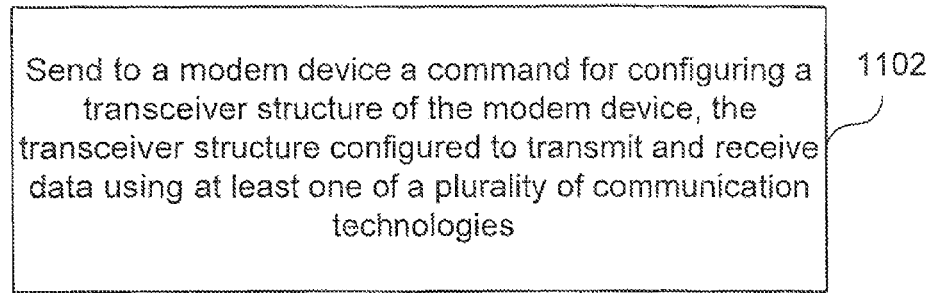
FIG. 11 shows a flow diagram illustrating a method for controlling the application processor of FIG. 10.

FIG. 11 shows a flow diagram 1100 illustrating a method for controlling an application processor. In 1102, the application processor may send to a modem device a command for configuring a transceiver structure of the modem device through a modem device interface of the application processor. The transceiver structure may be configured to transmit and receive data using at least one of a plurality of communication technologies. The command may include or may be information of a profile. The profile may include or may be information specifying a configuration of the transceiver structure for each communication technology of the plurality of communication technologies.

The command may include or may be an identifier of the profile.

The command may include or may be an AT command.

The application processor may send to the modem device a command for generating the profile through the modem device interface.

The application processor may receive from the modem device an identifier of the generated profile through the modem device interface.

The application processor may send to the modem device a command requesting to send information about the profile to the application processor through the modem device interface.

The application processor may send to the modem device a command for amending the profile through the modem device interface.

The profile may include or may be information indicating a type of media to be received by or sent from the transceiver structure.

The type of media may include or may be at least one the following: audio data; video data; and text data.

A method for controlling a communication device may be provided. The method may include the method illustrated in FIG. 11.

Figure 12:
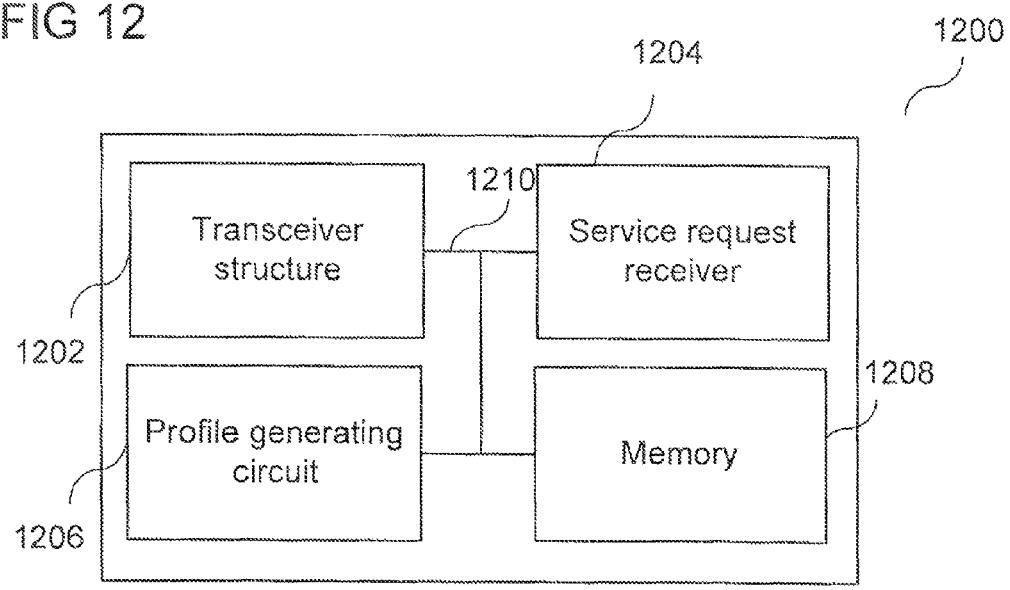
FIG. 12 shows a modem device for generating a profile upon a service request.

FIG. 12 shows a modem device 1200. The modem device 1200 may include a transceiver structure 1202 configured to transmit and receive data. The modem device 1200 may further include a service request receiver 1204 configured to receive a service request requesting a communication service using the transceiver structure 1202. The modem device 1200 may further include a profile generating circuit 1206 configured to generate a profile. The profile may include or may be information specifying a configuration of the transceiver structure 1202, based on the received service request. The modem device 1200 may further include a memory 1208 configured to store the profile. The transceiver structure 1202, the service request receiver 1204, the profile generating circuit 1206, and the memory 1208 may be coupled with each other, e.g. via a connection 1210, for example an optical connection or an electrical connection, such as e.g. a cable or a computer bus or via any other suitable electrical connection to exchange electrical signals.

The transceiver structure 1202 may include or may be a transceiver.

The transceiver structure 1202 may include or may be a plurality of transceivers.

The service request may include or may be an indication of an incoming connection.

The service request may include or may be an indication of an incoming call.

The modem device 1200 may further include an application processor interface (not shown).

The modem device 1200 may be configured to exchange information with an application processor through the application processor interface using AT commands.

The service request receiver may further be configured to receive the service request from the application processor using (in other words: through) the application processor interface.

The profile may include or may be a static portion and a dynamic portion. The profile generating circuit may further be configured to generate the dynamic portion of the profile, based on the received service request, and to read the static portion from the memory. The modem device may further be configured to delete the dynamic portion after the requested communication service has ended.

The modem device 1200 may be configured to send to the application processor an identifier of the generated profile through the application processor interface.

The modem device 1200 may further be configured to receive from the application processor a command for generating a further profile through the application processor interface.

The modem device 1200 may further include a profile generating circuit (not shown) configured to generate the further profile based on the command for generating the further profile.

The modem device 1200 may further be configured to send to the application processor an identifier of the generated further profile through the application processor interface.

The modem device 1200 may further be configured to receive from the application processor a command requesting to send information about the profile to the application processor through the application processor interface.

The modem device 1200 may further be configured to receive from the application processor a command for amending the profile through the application processor interface.

The profile may include or may be information indicating a type of media to be received by or sent from the transceiver structure.

The type of media may include or may be at least one of the following: audio data; video data; and text data.

A communication device may be provided. The communication device may include the modem device shown in FIG. 12

Figure 13:
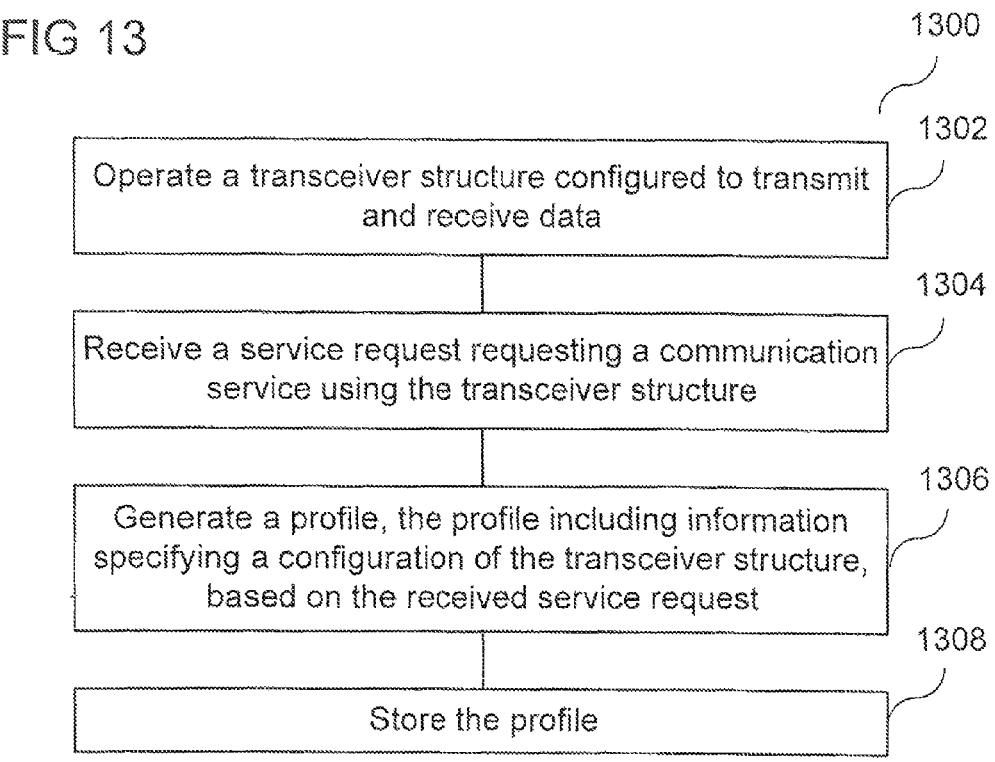
FIG. 13 shows a flow diagram illustrating a method for controlling the modem device of FIG. 12.

FIG. 13 shows a flow diagram 1300 illustrating a method for controlling a modem device. In 1302, the modem device may operate a transceiver structure configured to transmit and receive data. In 1304, a service request receiver of the modem device may receive a service request requesting a communication service using the transceiver structure. In 1306, a profile generating circuit of the modem device may generate a profile. The profile may include or may be information specifying a configuration of the transceiver structure, based on the received service request. In 1308, a memory of the modem device may store the profile.

The transceiver structure may include or may be a transceiver.

The transceiver structure may include or may be a plurality of transceivers.

The service request may include or may be an indication of an incoming connection.

The service request may include or may be an indication of an incoming call.

The modem device may operate an application processor interface.

The modem device may exchange information with an application processor through the application processor interface using AT commands.

The modem device may send to the application processor an identifier of the generated profile through the application processor interface.

The service request receiver may receive the service request from the application processor using (in other words: through) the application processor interface.

The profile may include or may be a static portion and a dynamic portion. The profile generating circuit may generate the dynamic portion of the profile, based on the received service request, and may read the static portion from the memory. The modem device may delete the dynamic portion after the requested communication service has ended.

The modem device may receive from the application processor a command for generating a further profile through the application processor interface.

The profile generating circuit may generate the further profile based on the command for generating the further profile.

The modem device may send to the application processor an identifier of the generated further profile through the application processor interface.

The modem device may receive from the application processor a command requesting to send information about the profile to the application processor through the application processor interface.

The modem device may receive from the application processor a command for amending the profile through the application processor interface.

The profile may include or may be information indicating a type of media to be received by or sent from the transceiver structure.

The type of media may include or may be at least one of the following: audio data; video data; and text data.

A method for controlling a communication device may be provided. The method may include the method illustrated in FIG. 13.

FIG. 14 shows a modem device 1400. The modem device 1400 may include a transceiver structure 1402 configured to transmit and receive data. The modem device 1400 may further include a profile generating circuit 1404 configured to generate a profile. The profile may include or may be information specifying a configuration of the transceiver structure 1408. The profile may include or may be a static portion and a dynamic portion. The modem device 1400 may further include a configuration circuit 1406 configured to configure the transceiver structure based on the profile. The modem device 1400 may further include a data communication connection setup circuit 1408 configured to set up a data communication connection using the configured transceiver structure 1408. The modem device 1400 may further include a memory 1410 configured to store the static portion. The modem device 1400 may be configured to delete the dynamic portion after the communication connection is terminated. The transceiver structure 1402, the profile generating circuit 1404, the configuration circuit 1406, the data communication connection setup circuit 1408, and the memory 1410 may be coupled with each other, e.g. via a connection 1412, for example an optical connection or an electrical connection, such as e.g. a cable or a computer bus or via any other suitable electrical connection to exchange electrical signals.

The transceiver structure 1402 may include or may be a transceiver.

The transceiver structure 1402 may include or may be a plurality of transceivers.

The modem device 1400 may further include an application processor interface (not shown).

The modem device 1400 may be configured to exchange information with an application processor through the application processor interface using AT commands.

The modem device 14000 may be configured to receive from the application processor a command for generating the profile through the application processor interface.

The modem device 1400 may further be configured to send to the application processor an identifier of the generated profile through the application processor interface.

The modem device 1400 may further be configured to receive from the application processor a command requesting to send information about the profile to the application processor through the application processor interface.

The modem device 1400 may further be configured to receive from the application processor a command for amending the profile through the application processor interface.

The profile may include or may be information indicating a type of media to be received by or sent from the transceiver structure.

The type of media may include or may be at least one of the following: audio data; video data; and text data.

A communication device may be provided. The communication device may include the modem device shown in FIG. 14.

FIG. 15 shows a flow diagram 1500 illustrating a method for controlling a modem device. In 1502, the modem device may operate a transceiver structure configured to transmit and receive data. In 1504, a profile generating circuit of the modem device may generate a profile. The profile may include or may be information specifying a configuration of the transceiver structure. The profile may include or may be a static portion and a dynamic portion. In 1506, a configuration circuit of the modem device may configure the transceiver structure based on the profile. In 1508, a data communication connection setup circuit of the modem device may set up a data communication connection using the configured transceiver structure. In 15120, a memory of the modem device may store the static portion. In 1512, the modem device may delete the dynamic portion after the communication connection is terminated.

The transceiver structure may include or may be a transceiver.

The transceiver structure may include or may be a plurality of transceivers.

The modem device may operate an application processor interface.

The modem device may exchange information with the application processor through the application processor interface using AT commands.

The modem device may receive from the application processor a command for generating the profile through the application processor interface.

The modem device may send to the application processor an identifier of the generated profile through the application processor interface.

The modem device may receive from the application processor a command requesting to send information about the profile to the application processor through the application processor interface.

The modem device may receive from the application processor a command for amending the profile through the application processor interface.

The profile may include or may be information indicating a type of media to be received by or sent from the transceiver structure.

The type of media may include or may be at least one of the following: audio data; video data; and text data.

A method for controlling a communication device may be provided. The method may include the method illustrated in FIG. 15.

Figure 16:
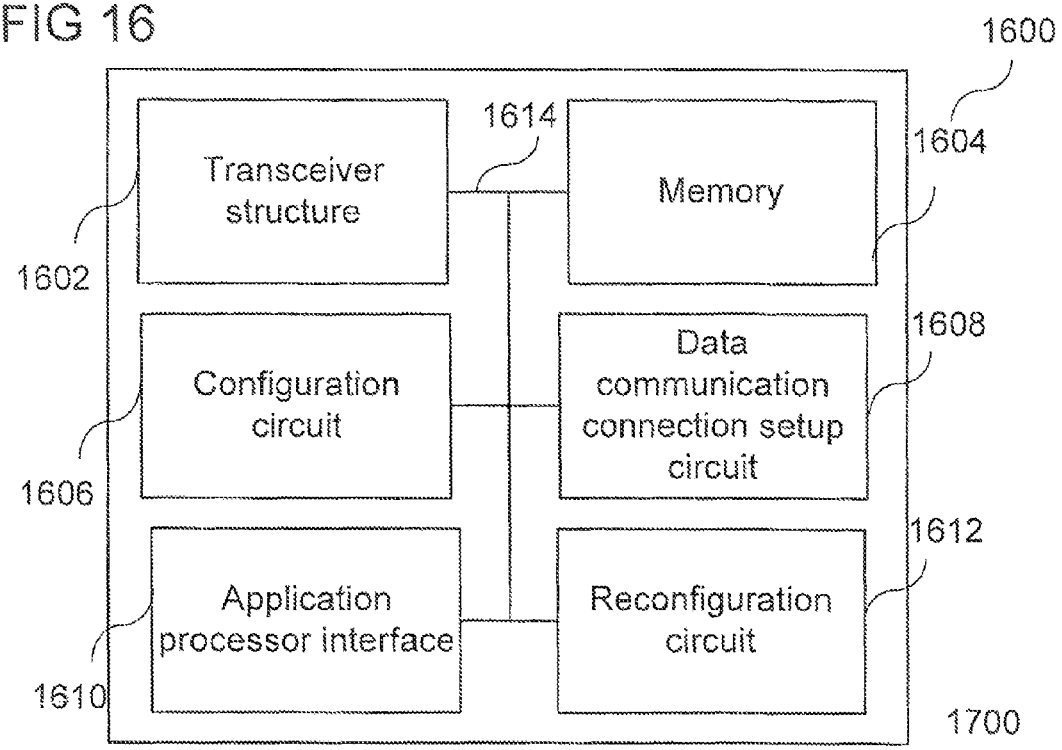
FIG. 16 shows a modem device for reconfiguring a transceiver structure upon receiving an instruction to amend a profile.

FIG. 16 shows a modem device 1600. The modem device 1600 may include a transceiver structure 1602 configured to transmit and receive data. The modem device 1600 may further include a memory 1604 configured to store a profile. The profile may include or may be information specifying a configuration of the transceiver structure. The modem device 1600 may further include a configuration circuit 1606 configured to configure the transceiver structure 1602 based on the profile. The modem device 1600 may further include a data communication connection setup circuit 1608 configured to set up a data communication connection using the configured transceiver structure 1602. The modem device 1600 may further include an application processor interface 1610. The modem device 1600 may be configured to receive from an application processor a command including or being an instruction to the modem device 1600 to amend the profile through the application processor interface 1610. The modem device 1600 may further include a reconfiguration circuit 1612 configured to change the configuration of the transceiver structure 1602 based on the command while the data communication connection is established. The transceiver structure 1602, the memory 1604, the configuration circuit 1606, the data communication connection circuit 1608, the application processor interface 1610, and the reconfiguration circuit 1612 may be coupled with each other, e.g. via a connection 1614, for example an optical connection or an electrical connection, such as e.g. a cable or a computer bus or via any other suitable electrical connection to exchange electrical signals.

The transceiver structure may include or may be a transceiver.

The transceiver structure may include or may be a plurality of transceivers.

The modem device 1600 may further include a profile amending circuit (not shown) configured to amend the profile based on the command.

The command may include or may be an identifier of the profile.

The command may include or may be an AT command.

The modem device 1600 may further be configured to receive from the application processor a command for generating the profile through the application processor interface 1610.

The modem device 1600 may further be configured to send to the application processor an identifier of the generated profile through the application processor interface 1610.

The modem device 1600 may further be configured to receive from the application processor a command requesting to send information about the profile to the application processor through the application processor interface 1610.

The profile may include or may be information indicating a type of media to be received by or sent from the transceiver structure 1602.

The type of media may include or may be at least one of the following: audio data; video data; and text data.

A communication device may be provided. The communication device may include the modem device shown in FIG. 16.

Figure 17:
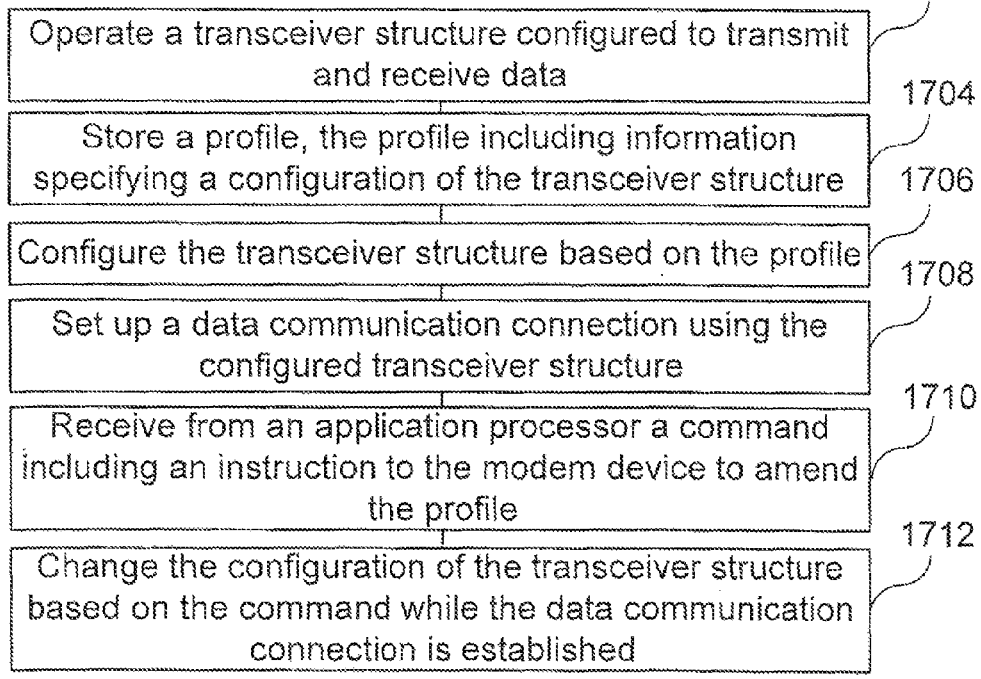
FIG. 17 shows a flow diagram illustrating a method for controlling the modem device of FIG. 16.

FIG. 17 shows a flow diagram 1700 illustrating a method for controlling a modem device. In 1702, the modem device may operate a transceiver structure configured to transmit and receive data. In 1704, a memory of the modem device may store a profile. The profile may include or may be information specifying a configuration of the transceiver structure. In 1706, a configuration circuit of the modem device may configure the transceiver structure based on the profile. In 1708, a data communication connection setup circuit of the modem device may set up a data communication connection using the configured transceiver structure. In 1710, the modem device may receive from an application processor a command including or being an instruction to the modem device to amend the profile through an application processor interface.

In 1712, the modem device may change the configuration of the transceiver structure based on the command while the data communication connection is established.

The transceiver structure may include or may be a transceiver.

The transceiver structure may include or may be a plurality of transceivers.

The modem device may amend the profile based on the command.

The command may include or may be an identifier of the profile.

The command may include or may be an AT command.

The modem device may receive from the application processor a command for generating the profile through the application processor interface.

The modem device may send to the application processor an identifier of the generated profile through the application processor interface.

The modem device may receive from the application processor a command requesting to send information about the profile to the application processor through the application processor interface.

The profile may include or may be information indicating a type of media to be received by or sent from the transceiver structure.

The type of media may include or may be at least one of the following: audio data; video data; and text data.

A method for controlling a communication device may be provided. The method may include the method illustrated in FIG. 17.

Figure 18:
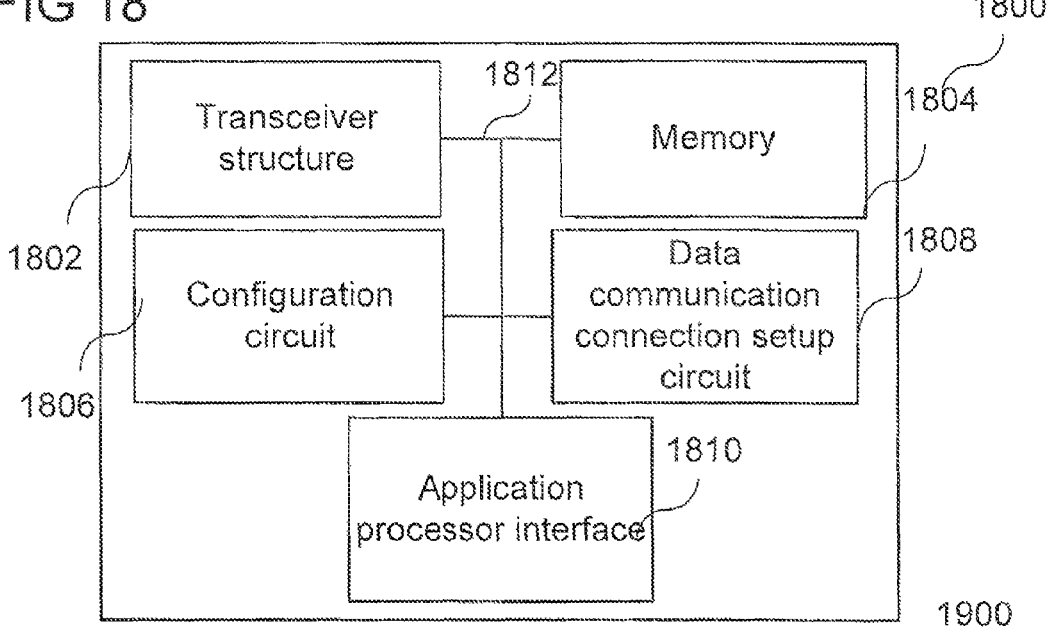
FIG. 18 shows a modem device for keeping a configuration of a transceiver structure upon receiving an instruction to amend a profile.

FIG. 18 shows a modem device 1800. The modem device 1800 may include a transceiver structure 1802 configured to transmit and receive data. The modem device 1800 may further include a memory 1804 configured to store a profile. The profile may include or may be information specifying a configuration of the transceiver structure 1802. The modem device 1800 may further include a configuration circuit 1806 configured to configure the transceiver structure 1802 based on the profile. The modem device 1800 may further include a data communication connection setup circuit 1808 configured to set up a data communication connection using the configured transceiver structure 1802. The modem device 1800 may further include an application processor interface 1810. The modem device 1800 may be configured to receive from an application processor a first command including or being an instruction to amend the profile and a second command for reconfiguring the transceiver structure 1802 based on the amended profile (or based on the first command) through the application processor interface 1810. The modem device 1800 may further be configured to keep (in other words: to keep unchanged) the configuration of the transceiver structure 1802 until at least one of the reception of the second command and a termination of the data communication connection. The transceiver structure 1802, the memory 1804, the configuration circuit 1806, the data communication connection setup circuit 1808, and the application processor interface 1810 may be coupled with each other, e.g. via a connection 1812, for example an optical connection or an electrical connection, such as e.g. a cable or a computer bus or via any other suitable electrical connection to exchange electrical signals.

The transceiver structure 1802 may include or may be a transceiver.

The transceiver structure 1802 may include or may be a plurality of transceivers.

The modem device 1800 may further include a profile amending circuit (not shown) configured to amend the profile based on the first command.

The first command may include or may be an identifier of the profile.

The second command may include or may be an identifier of the profile.

The first command may include or may be an AT command.

The second command may include or may be an AT command.

The modem device 1800 may further be configured to receive from the application processor a command for generating the profile through the application processor interface 1810.

The modem device 1800 may further be configured to send to the application processor an identifier of the generated profile through the application processor interface 1810.

The modem device 1800 may further be configured to receive from the application processor a command requesting to send information about the profile to the application processor through the application processor interface 1810.

The profile may include or may be information indicating a type of media to be received by or sent from the transceiver structure 1802.

The type of media may include or may be at least one of the following: audio data; video data; and text data.

A communication device may be provided. The communication device may include the modem device shown in FIG. 18.

Figure 19:
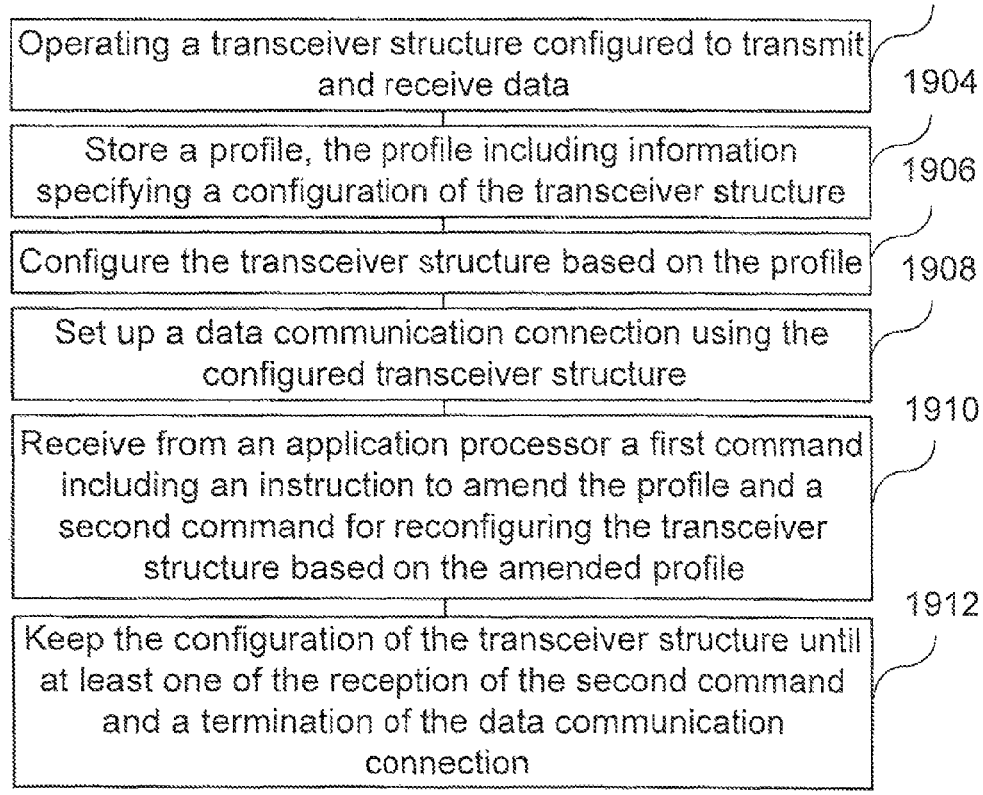
FIG. 19 shows a flow diagram illustrating a method for controlling the modem device of FIG. 18.

FIG. 19 shows a flow diagram 1900 illustrating a method for controlling a modem device. In 1902, the modem device may operate a transceiver structure configured to transmit and receive data. In 1904, a memory of the modem device may store a profile. The profile may include or may be information specifying a configuration of the transceiver structure. In 1906, a configuration circuit of the modem device may configure the transceiver structure based on the profile. In 1908, a data communication connection setup circuit of the modem device may set up a data communication connection using the configured transceiver structure. In 1910, the modem device may receive from an application processor a first command including or being an instruction to amend the profile and a second command for reconfiguring the transceiver structure based on the amended profile (or based on the first command) through an application processor interface of the modem device. In 1912, the modem device may keeping (in other words: keep unchanged) the configuration of the transceiver structure until at least one of the reception of the second command and a termination of the data communication connection.

The transceiver structure may include or may be a transceiver.

The transceiver structure may include or may be a plurality of transceivers.

The modem device may amend the profile based on the first command.

The first command may include or may be an identifier of the profile.

The second command may include or may be an identifier of the profile.

The first command may include or may be an AT command.

The second command may include or may be an AT command.

The modem device may receive from the application processor a command for generating the profile through the application processor interface.

The modem device may send to the application processor an identifier of the generated profile through the application processor interface.

The modem device may receive from the application processor a command requesting to send information about the profile to the application processor through the application processor interface.

The profile may include or may be information indicating a type of media to be received by or sent from the transceiver structure.

The type of media may include or may be at least one of the following: audio data; video data; and text data.

A method for controlling a communication device may be provided. The method may include the method illustrated in FIG. 19.

The modem device and/or the application processor and/or the communication device may be configured to send and/or receive data according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11 VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While various embodiments have been particularly shown and described with reference to specific aspects of this disclosure, it should be understood by those skilled in the art that various changes in form and detail may be made therein without departing from the spirit and scope of various embodiments as defined by the appended claims. The scope of various embodiments is thus indicated by the appended claims and all changes which come within the meaning and range of equivalency of the claims are therefore intended to be embraced.

What is claimed is:

1. A mobile device, comprising a terminal equipment (TE) and a mobile termination (MT), wherein the MT comprises a transceiver, a TE interface and a media profile generation module, wherein:
   the TE is configured to send, to the MT, a first command instructing the MT to generate a media profile, wherein the first command is an AT command including a media description for the media profile and wherein the media description complies with a session description protocol (SDP); and
   the MT is configured to generate, by the media profile generation module, the media profile in response to receiving the first command, and the MT is configured to send, to the TE, an identification number of the media profile as a response to the first command,
   wherein the media profile comprises a static part and a dynamic part, the static part being defined for more than one communication session and the dynamic part being defined per communication session.

2. The mobile device of claim 1, wherein the TE is further to send, to the MT, a second command to initiate a communication using the media profile, wherein the second command is a AT command including the identification number of the media profile.

3. The mobile device of claim 1, wherein the media profile is to support at least one of audio media and video media.

4. The mobile device of claim 1, wherein the first command is +CDEFMP command in compliance with a third Generation Partnership Project (3GPP) Long Term Evolution (LTE) project.

5. The mobile device of claim 1, wherein the second command is +CDU command in compliance with a third Generation Partnership Project (3GPP) Long Term Evolution (LTE) project.

6. The mobile device of claim 1, wherein the TE comprises an application processor and a MT interface.

7. The mobile device of claim 1, further comprising an antenna.

8. A mobile device, comprising: a terminal equipment (TE) and a mobile termination (MT), wherein:
in response to the MT receiving a first call from a remote party, and, sending to the TE, a command to propose a first media profile for the first call, wherein the command is an AT command including a media description for the first media profile and the media description complies with a session description protocol (SDP);
in response to receiving the command proposing the first media profile the TE accepts the first media profile, or, proposes to the MT, a second media profile for the first call,
wherein the first media profile comprises a static part and a dynamic part, the static part defined for the first call and at least one additional call, the dynamic part defined for only the first call.

9. The mobile device of claim 8, wherein the TE comprises an application processor and a MT interface.

10. The mobile device of claim 8, wherein the MT comprises a transceiver, a TE interface and a media profile generation module to generate the media profile.

11. The mobile device of claim 8, further comprising an antenna.

12. A mobile device, comprising: a terminal equipment (TE) and a mobile termination (MT), wherein:
the TE sends, to the MT, a command to modify a previously generated media profile for a call, wherein the command is an AT command including a media description for the media profile and wherein the media description complies with the a session description protocol (SDP),
wherein the first media profile comprises a static part and a dynamic part, the static part being defined for the call and at least one additional call, the dynamic part being defined for only the call; and
the MT modifies the media profile in response to receiving the command.

13. The mobile device of claim 12, wherein the TE comprises an application processor and a MT interface.

14. The mobile device of claim 12, wherein the MT comprises a transceiver, a TE interface, and a media profile generation module to generate the media profile.

15. The mobile device of claim 12, further comprising an antenna.

16. A method, employed by a mobile device having a terminal equipment (TE) and a mobile termination (MT), comprising:
sending, from the TE to the MT, a first command instruction the MT to generate a media profile, wherein the first command is an AT command including a media description for the media profile, and
wherein the media description complies with a session description protocol (SDP);
generating, by the MT, the media profile in response to receiving the first command, wherein the media profile comprises a static part and a dynamic part, the static part being defined for more than one communication session and the dynamic part being defined per communication session; and
returning, from the MT to the TE, an identification number of the media profile as a response to the command.

17. The method of claim 16, further comprising: sending, from the TE to the MT, a second command to initiate a communication using the media profile, wherein the second command is a AT command including the identification number of the media profile.

18. The method of claim 16, wherein the media profile supports at least one of audio media and video media.

19. The method of claim 16, wherein the first command is +CDEFMP command in compliance with a third Generation Partnership Project (3GPP) Long Term Evolution (LTE) project.

20. The method of claim 16, wherein the second command is +CDU command in compliance with a third Generation Partnership Project (3GPP) Long Term Evolution (LTE) project.

21. The method of claim 16, wherein the MT comprises a transceiver, a TE interface and a media profile generation module to generate the media profile.

22. A method, employed by a mobile device having a terminal equipment (TE) and a mobile termination (MT), comprising:
receiving, by the MT, a first call from a remote party;
sending, from the MT to the TE, a command to propose a first media profile for the first call, wherein the command is an AT command including a media description for the first media profile and the media description complies with a session description protocol (SDP); and
in response to receiving the command proposing the first media profile, accepting, by the TE, the first media profile, or, proposing from the TE to the MT, a second media profile for the first call,
wherein the first media profile comprises a static part and a dynamic part, the static part being defined for the call and at least one additional call, the dynamic part being defined for only the call.

23. The method of claim 22, wherein the MT comprises a transceiver, a TE interface and a media profile generation module to generate the media profile.

24. A method, employed by a mobile device having a terminal equipment (TE) and a mobile termination (MT), comprising:
sending, from the TE to the MT, a command to modify a previously generated media profile of a call, wherein the command is an AT command including a media description for the media profile, and wherein the media description complies with the a session description protocol (SDP); and
modifying, by the MT, the media profile in response to receiving the command,
wherein the first media profile comprises a static part and a dynamic part, the static part being defined for the call and at least one additional call, the dynamic part being defined for only the call.

25. The method of claim 24, wherein the MT comprises a transceiver, a TE interface and a media profile generation module to generate the media profile.

26. A terminal equipment (TE), comprising a TE interface configured to:
send, to a mobile termination (MT), a first command to instruction the MT to generate a media profile, wherein the first command is an AT command including a media description for the media profile and the media description complies with a session description protocol (SDP); and
receive, from the MT, an identification number of the generated media profile as a response to the first command,
wherein the media profile comprises a static part and a dynamic part, the static part being defined for more than one communication session and the dynamic part being defined per communication session.

27. A mobile termination (MT), comprising a MT interface configured to:
- receive, from a terminal equipment (TE), a first command instruction the MT to generate a media profile, wherein the first command is an AT command including a media description for the media profile and the media description complies with a session description protocol (SDP);
- generate, by the MT, the media profile in response to receiving the first command; and
- send, to the TE, an identification number of the media profile as a response to the first command,
- wherein the media profile comprises a static part and a dynamic part, the static part being defined for more than one communication session and the dynamic part being defined per communication session.

* * * * *

UNITED STATES PATENT AND TRADEMARK OFFICE
CERTIFICATE OF CORRECTION

PATENT NO.      : 9,144,110 B2
APPLICATION NO. : 14/316978
DATED           : September 22, 2015
INVENTOR(S)     : Parron Page 1 of 1

It is certified that error appears in the above-identified patent and that said Letters Patent is hereby corrected as shown below:

In the claims

Claim 12 - Column 25, line 32 delete "complies with the a session description" and insert --complies with a session description-- in place thereof.

Claim 24 - Column 26 line 43 delete "complies with the a session description" and insert --complies with a session description-- in place thereof.

Signed and Sealed this
Fourteenth Day of June, 2016

Michelle K. Lee
*Director of the United States Patent and Trademark Office*